United States Patent
Kishimoto et al.

(10) Patent No.: US 10,742,846 B2
(45) Date of Patent: Aug. 11, 2020

(54) INFORMATION PROCESSING APPARATUS AND NON-TRANSITORY COMPUTER READABLE MEDIUM FOR PRESENTING VISUAL EFFECT OF SPOT COLOR

(71) Applicant: FUJI XEROX CO., LTD., Tokyo (JP)

(72) Inventors: Yasunari Kishimoto, Kanagawa (JP); Takayuki Yamamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/059,059

(22) Filed: Aug. 9, 2018

(65) Prior Publication Data

US 2019/0132487 A1    May 2, 2019

(30) Foreign Application Priority Data

Oct. 30, 2017   (JP) ................. 2017-209500

(51) Int. Cl.
*H04N 1/60*   (2006.01)
*G03G 15/00*   (2006.01)

(52) U.S. Cl.
CPC ....... *H04N 1/6005* (2013.01); *G03G 15/6585* (2013.01); *H04N 1/6008* (2013.01); *H04N 1/6011* (2013.01); *H04N 1/6075* (2013.01); *G03G 2215/0081* (2013.01)

(58) Field of Classification Search
CPC .................................................. H04N 1/6005
USPC ...................................... 358/1.15
See application file for complete search history.

(56) References Cited

U.S. PATENT DOCUMENTS

| | | | | |
|---|---|---|---|---|
| 6,507,413 B1* | 1/2003 | Mueller | ............... | B41J 3/407 358/1.9 |
| 6,519,050 B1* | 2/2003 | Eintracht | ............ | H04N 1/6033 358/1.15 |
| 6,600,574 B2 | 7/2003 | Miyano | | |
| 2007/0195347 A1* | 8/2007 | Momose | ................. | H04N 1/62 358/1.9 |
| 2009/0116048 A1* | 5/2009 | Usami | ................. | H04N 1/6011 358/1.9 |
| 2013/0201207 A1* | 8/2013 | Bryant | ................. | H04N 1/407 345/600 |
| 2018/0033382 A1* | 2/2018 | Tomizawa | .......... | G09G 3/3413 |
| 2018/0260176 A1* | 9/2018 | Arockiasamy | ....... | H04N 1/6008 |
| 2018/0332195 A1* | 11/2018 | Das | ..................... | H04N 1/6097 |

FOREIGN PATENT DOCUMENTS

| | | |
|---|---|---|
| JP | 2000047846 | 2/2000 |
| JP | 2004074498 | 3/2004 |
| JP | 6132004 | 5/2017 |

* cited by examiner

*Primary Examiner* — Jacky X Zheng
(74) *Attorney, Agent, or Firm* — JCIPRNET (57) ABSTRACT

An information processing apparatus includes a display and a controller. The display displays an image. The controller controls the display to display a color setting section that sets information regarding a selected color selected from among multiple predetermined colors, and an effect presenting section that presents visual effect information representing a visual effect of the selected color.

16 Claims, 7 Drawing Sheets

INFORMATION PROCESSING APPARATUS AND NON-TRANSITORY COMPUTER READABLE MEDIUM FOR PRESENTING VISUAL EFFECT OF SPOT COLOR

CROSS-REFERENCE TO RELATED APPLICATIONS

This application is based on and claims priority under 35 USC 119 from Japanese Patent Application No. 2017-209500 filed Oct. 30, 2017.

BACKGROUND

(i) Technical Field

The present invention relates to an information processing apparatus and a non-transitory computer readable medium.

(ii) Related Art

For example, to edit a to-be-formed image in the case of performing printing including a spot color that represents a texture such as shininess, glossiness, metallicness, or transparency by using an image forming apparatus or paper, the image displayed on a display is red-green-blue (RGB)-displayed, which means that effects unique to the spot color are not presented.

SUMMARY

According to an aspect of the invention, there is provided an information processing apparatus including a display and a controller. The display displays an image. The controller controls the display to display a color setting section that sets information regarding a selected color selected from among multiple predetermined colors, and an effect presenting section that presents visual effect information representing a visual effect of the selected color.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described in detail with reference to the drawings.

An information processing apparatus and a non-transitory computer readable medium storing a program according to the exemplary embodiment will be described with reference to FIGS. 1 to 5B.

Figure 1:
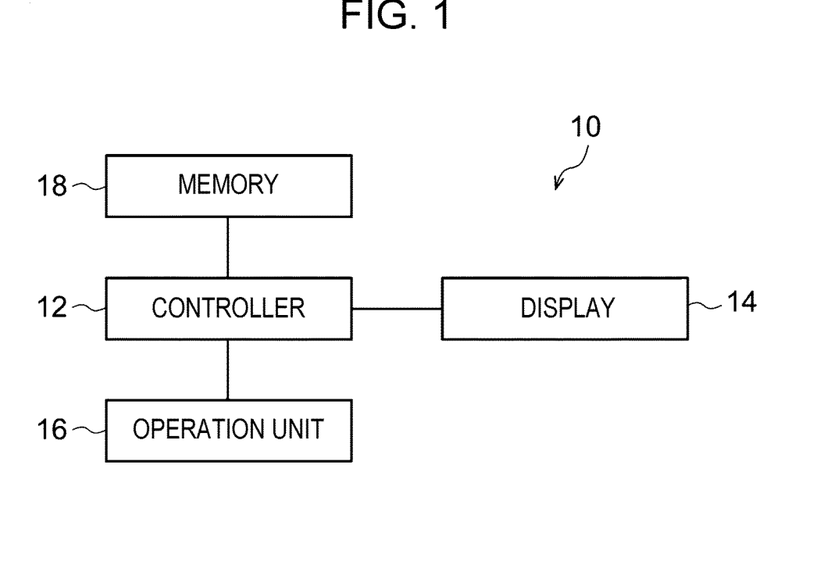
FIG. 1 is a functional block diagram illustrating a schematic configuration of an information processing apparatus according to an exemplary embodiment.

FIG. 1 illustrates an exemplary configuration of an information processing apparatus 10 according to the exemplary embodiment. As illustrated in FIG. 1, the information processing apparatus 10 according to the exemplary embodiment includes a controller 12, a display 14, an operation unit 16, and memory 18. The information processing apparatus 10 has the function of editing an image via a user interface (UI) displayed on the display 14, particularly the function of setting a visual effect that represents the texture of a selected spot color or the function of editing a visual effect that represents a texture in a specified area of an image serving as a target being edited (hereinafter referred to as a "target image"). Although there is no particular restriction on the type of target image in the exemplary embodiment, the case of image information of an image to be formed (printed) by an electrophotographic image forming apparatus using toner will be described by way of example.

The controller 12 is, for example, a general personal computer (PC), and includes a central processing unit (CPU), read-only memory (ROM), random-access memory (RAM), and a network interface, which are not illustrated in the drawings. The CPU integrates and controls the entire information processing apparatus 10. The ROM is memory that stores in advance a control program of the information processing apparatus 10. The RAM is memory used as a work area for execution of a program such as the control program. Note that the controller 12 corresponds to a "controller" according to an exemplary embodiment of the present invention.

The display 14 mainly displays a spot-color display area (window) 22, an RGB display area (window) 24, and a preview display area (window) 26, which will be described later and which are UIs for executing information processing according to the exemplar embodiment. Although there is no particular restriction on the display 14, for example, a liquid crystal monitor, a cathode ray tube (CRT) monitor, or a flat panel display (FPD) monitor is used as the display 14. In the following description, the spot-color display area 22, the RGB display area 24, and the preview display area 26 may be collectively referred to as "display areas".

The operation unit 16 is a member for an operator (user) to operate the display areas, and includes, for example, a keyboard and a pointing device (a mouse, a stylus, and the like).

The memory 18 is a member that mainly stores a spot color provided with a later-described texture edited in the display areas, and a target image. In addition, the memory 18 may store a program for controlling the entire information processing apparatus 10. Although there is no particular restriction on the memory 18, an external storage device such as a hard disk drive (HDD), compact-disc read-only memory (CD-ROM), CD-recordable (CD-R), CD-rewritable (CD-RW), digital versatile disc (DVD) ROM, DVD-R, DVD-RW, or DVD-RAM is used as the memory 18.

Figure 2:
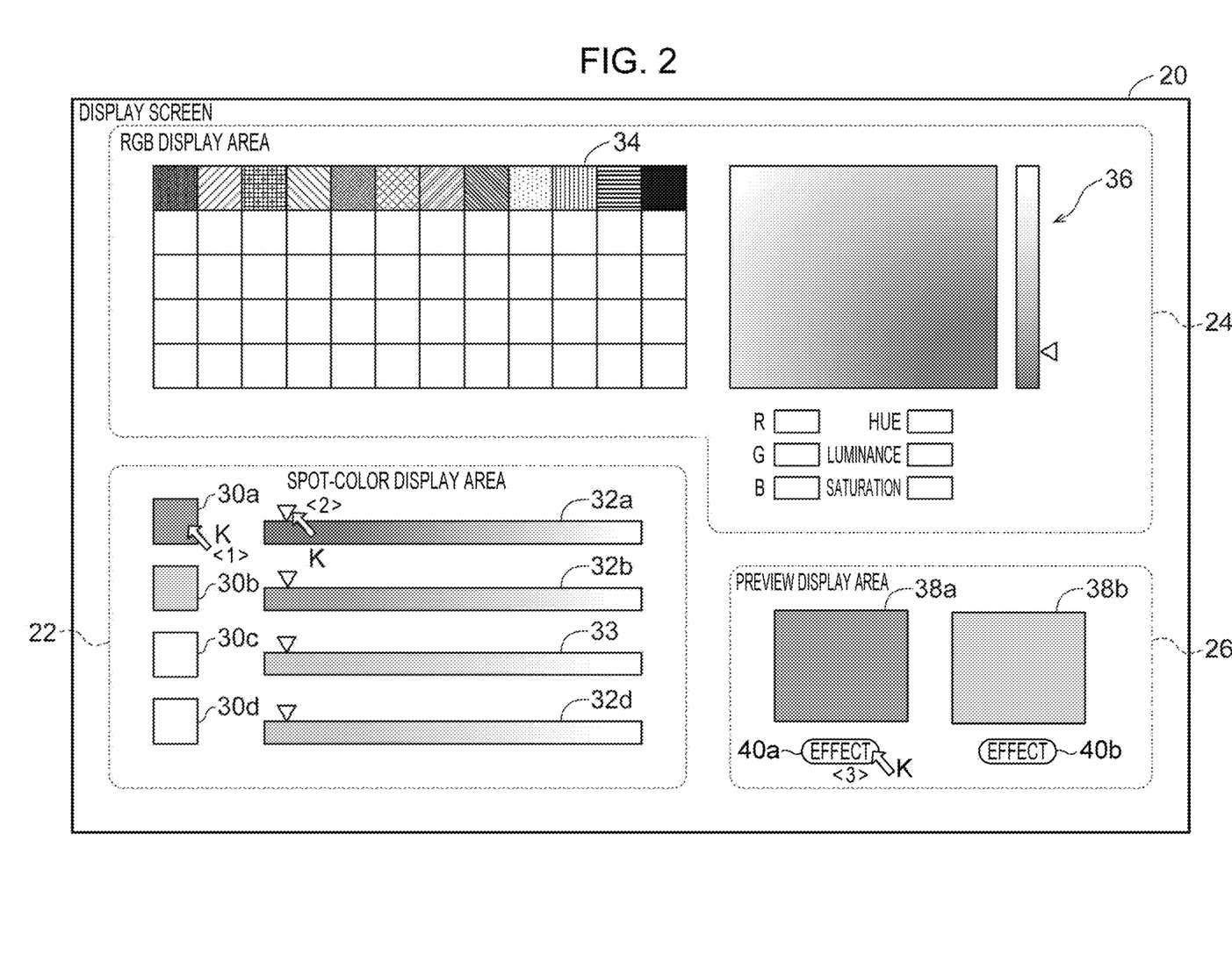
FIG. 2 is a diagram illustrating the screen configuration of a display according to the exemplary embodiment.

FIG. 2 illustrates a display screen 20, which is a screen of the display 14. The display screen 20 illustrated in FIG. 2 displays, by way of example of an editing screen (UI screen), the spot-color display area 22, the RGB display area 24, and the preview display area 26. These display areas are operated by the operation unit 16 including a mouse.

The spot-color display area 22 is a window for selecting and editing a spot color in connection with a visual effect that represents a texture according to the exemplary embodiment. In the exemplary embodiment, "spot colors" refer to colors such as gold, silver, white, transparent colors, high saturation colors (fluorescent colors), and pearl colors. Using such a spot color for, for example, an image printed by an image forming apparatus allows representation of a texture such as shininess, glossiness, metallicness, or transparency. Although there is no restriction on selection of spot colors handled in an exemplary embodiment of the present invention, the exemplary embodiment discusses, for example, as illustrated in FIG. 2, a gold selecting part 30a, a silver selecting part 30b, a transparent-color selecting part 30c, and a white selecting part 30d (hereinafter these selecting parts may be collectively referred to as "spot-color selecting parts 30"). Note that the spot-color display area 22 corresponds to a "color setting section" according to an exemplary embodiment of the present invention, and a spot color selected in the spot-color display area 22 corresponds to a "selected color" according to an exemplary embodiment of the present invention.

In the spot-color display area 22 according to the exemplary embodiment, the gold selecting part 30a, the silver selecting part 30b, and the white selecting part 30d are provided with a gold gradation bar 32a, a silver gradation bar 32b, and a white-color gradation bar 32d, respectively (hereinafter these gradation bars may be collectively referred to as "gradation bars 32"). With the gradation bars 32, the density of corresponding colors is selected. In addition, the transparent-color selecting part 30c is provided with a transmittance setting bar 33. With the transmittance setting bar 33, the transparency of a transparent color is selected. A spot color is selected in one of the spot-color selecting parts 30 using a cursor K (an operation indicated as <1> in FIG. 2), and the characteristics of the spot color are further set using a corresponding one of the gradation bars 32 or the transmittance setting bar 33 (an operation indicated as <2> in FIG. 2), thereby determining the spot color. The determined spot color is displayed in the preview display area 26. These are partially displayed in accordance with the user's preferences using tabs, detailed screens, and the like.

The RGB display area 24 is a UI for setting red (R), green (G), and blue (B). The RGB display area 24 according to the exemplary embodiment includes a color palette 34 and a color chart 36 by way of example. The color palette 34 is an area for selecting a color from preset RGB colors. The color chart 36 is an area for setting RGB colors using a gradation bar or by directly setting hue, luminance, and saturation.

The preview display area 26 is a window for checking the texture of a spot color selected and set in the spot-color display area 22. As illustrated in FIG. 2, the preview display area 26 includes a first preview part 38a and a second preview part 38b (hereinafter these preview parts may be collectively referred to as "preview parts 38"), a first effect button 40a, and a second effect button 40b. For example, a spot color determined in the spot-color display area 22 is displayed by activating the first preview part 38a with the use of the cursor K. In response to pressing of the first effect button 40a with the use of the cursor K (an operation indicated as <3> in FIG. 2), the texture of the spot color is presented in the first preview part 38a. The same applies to the operation of the second preview part 38b and the second effect button 40b. The reason that there are two preview parts 38 in the exemplary embodiment is, for example, to allow comparison of spot colors having different gradations, and there may be only one preview part 38. The preview parts 38 correspond to an "effect presenting section" according to an exemplary embodiment of the present invention.

By the way, to edit a to-be-formed image in the case of performing printing including a spot color that represents a texture such as shininess, glossiness, metallicness, or transparency by using an image forming apparatus, the image displayed on a display is RGB-displayed, which means that effects unique to the spot color are not presented. Therefore, on an editing screen of the related art, it has been difficult to perform editing while checking the visual effects of a spot color.

To this end, an exemplary embodiment of the present invention is configured such that the effects of a texture expected from a spot color are pseudo-expressed in each image area on an editing screen. In doing so, an information processing apparatus provided with an editing screen on which visual effects that represent a texture added to a color are checked, and a non-transitory computer readable medium storing a program are provided.

Now, a configuration for pseudo-expressing a texture on the display 14 in the exemplary embodiment will be described. The glossiness of gold, silver, or the like, the metallicness of a metallic color, and so forth are perceived when a human being visually feels a change in luminance information included in that color. In other words, when external light or the light of lighting equipment is reflected in color information of diffuse reflection light and the reflection light changes over time, glossiness or metallicness is perceived as visual information. Therefore, if an image with high luminance information is changed over time in an area of that color on the display screen 20, glossiness or metallicness is presented to the user. In contrast, as the luminance of a color becomes higher, the more that color approaches white. In the exemplary embodiment, a white image is selected as an example of color information whose luminance information is high, and this white image is changed over time. In the exemplary embodiment, the texture of a spot color is presented to the user on the display screen 20 according to the above principle.

Figure 3A:
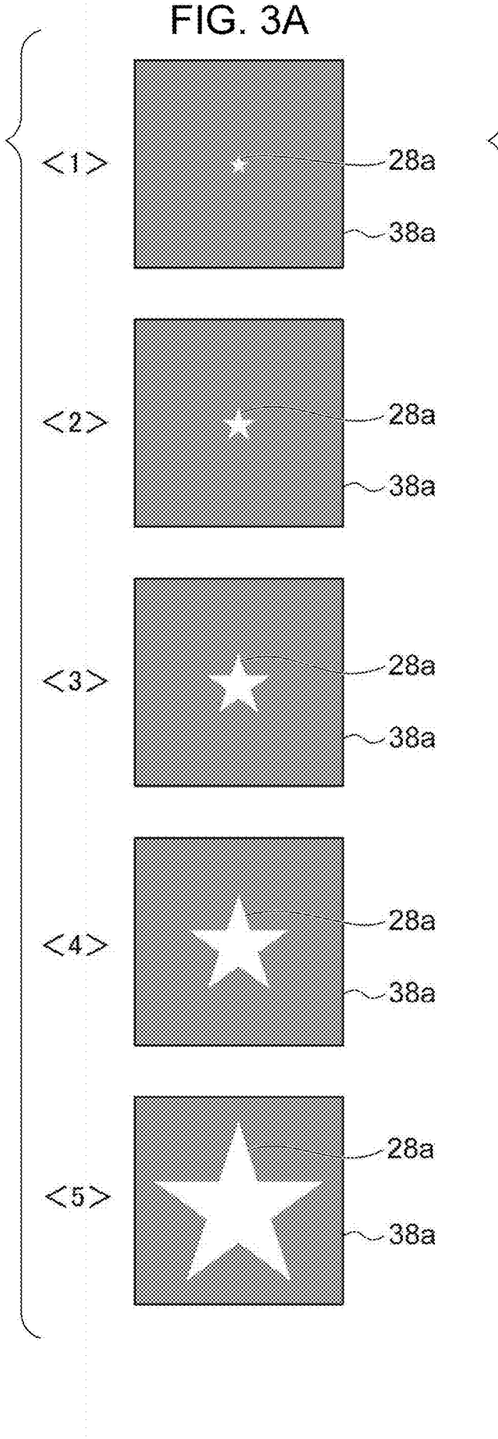
FIGS. 3A and 3B include diagrams describing pseudo-presentation of a texture according to the exemplary embodiment.
Figure 3B:
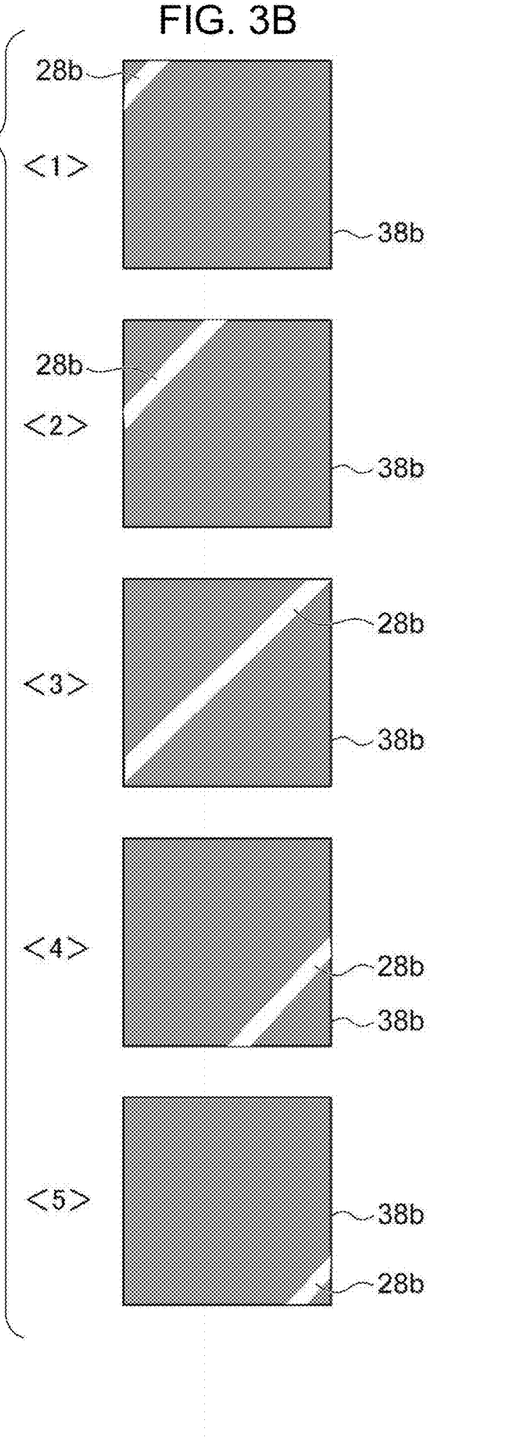

Referring to FIGS. 3A and 3B, the texture of a spot color according to the exemplary embodiment will be described in more detail. FIG. 3A illustrates the case of presenting the glossiness of gold serving as a spot color, and FIG. 3B illustrates the case of presenting the glossiness of silver serving as a spot color.

As illustrated in FIG. 3A, in the case of presenting the texture of gold, for example, gold selected and set in the spot-color display area 22 is displayed in the first preview part 38a, and the first effect button 40a is pressed with the cursor K. With this operation, the texture of gold, that is, glossiness, is presented in the first preview part 38a. That is, a star-shaped white image 28a, which is an example of an image with high luminance information, is displayed in the first preview part 38a. In this example, as indicated in <1> to <5> in FIG. 3A, the size of the white image 28a is changed to change the white image over time. In doing so, the glossiness of gold is presented in the first preview part 38a. Although a star shape is illustrated by way of example of the white image 28a in the exemplary embodiment, the shape is not restricted to a star shape, and the shape may be other shapes such as a circle, an ellipse, or a polygon.

In the exemplary embodiment, in the case of gold, the color around the white image 28a (the base color) in the first preview part 38a is ocher, for example. In other words, in the exemplary embodiment, in the case of presenting the glossiness of gold, a white image is changed over time in a predetermined ocher image area. Therefore, using the gold gradation bar 32a, the gradation of this ocher color may be changed. In addition, changes of the white image 28a over time may be represented using, for example, an animation function of an image file format (such as Graphics Interchange Format (GIF), Joint Photographic Experts Group (JPEG), or Portable Network Graphics (PNG)).

In contrast, as illustrated in FIG. 3B, in the case of presenting the texture of silver, for example, silver selected and set in the spot-color display area 22 is displayed in the second preview part 38b, and the second effect button 40b is pressed with the cursor K. With this operation, the texture of silver, that is, glossiness, is presented in the second preview part 38b. That is, a linear white image 28b, which is an example of an image with high luminance information, is displayed. In this example, as indicated in <1> to <5> in FIG. 3B, the white image 28b is moved in a predetermined direction (a direction from the upper left to the lower right of the page in the example illustrated in FIG. 3B) to change the white image over time. In doing so, the glossiness of silver is presented in the second preview part 38b. Although a linear shape is illustrated by way of example of the white image 28b in the exemplary embodiment, the shape is not restricted to a linear shape, and the shape may be other shapes such as a zigzag straight line or a wave-shaped curve.

In the exemplary embodiment, in the case of silver, the color around the white image 28b (the base color) in the second preview part 38b is gray, for example. In other words, in the exemplary embodiment, in the case of presenting the glossiness of silver, a white image is changed over time in a predetermined gray image area. Therefore, using the silver gradation bar 32b, the gradation of this gray color may be changed. In addition, changes of the white image 28b over time may be represented using, for example, an animation function of an image file format (such as GIF, JPEG, or PNG). Although the configuration where a star-shaped white image is used for the texture of gold and a linear white image is used for the texture of silver has been described by way of example in the exemplary embodiment, the configuration is only exemplary, and a white image for each color is not restricted to that described above.

Figure 4A:
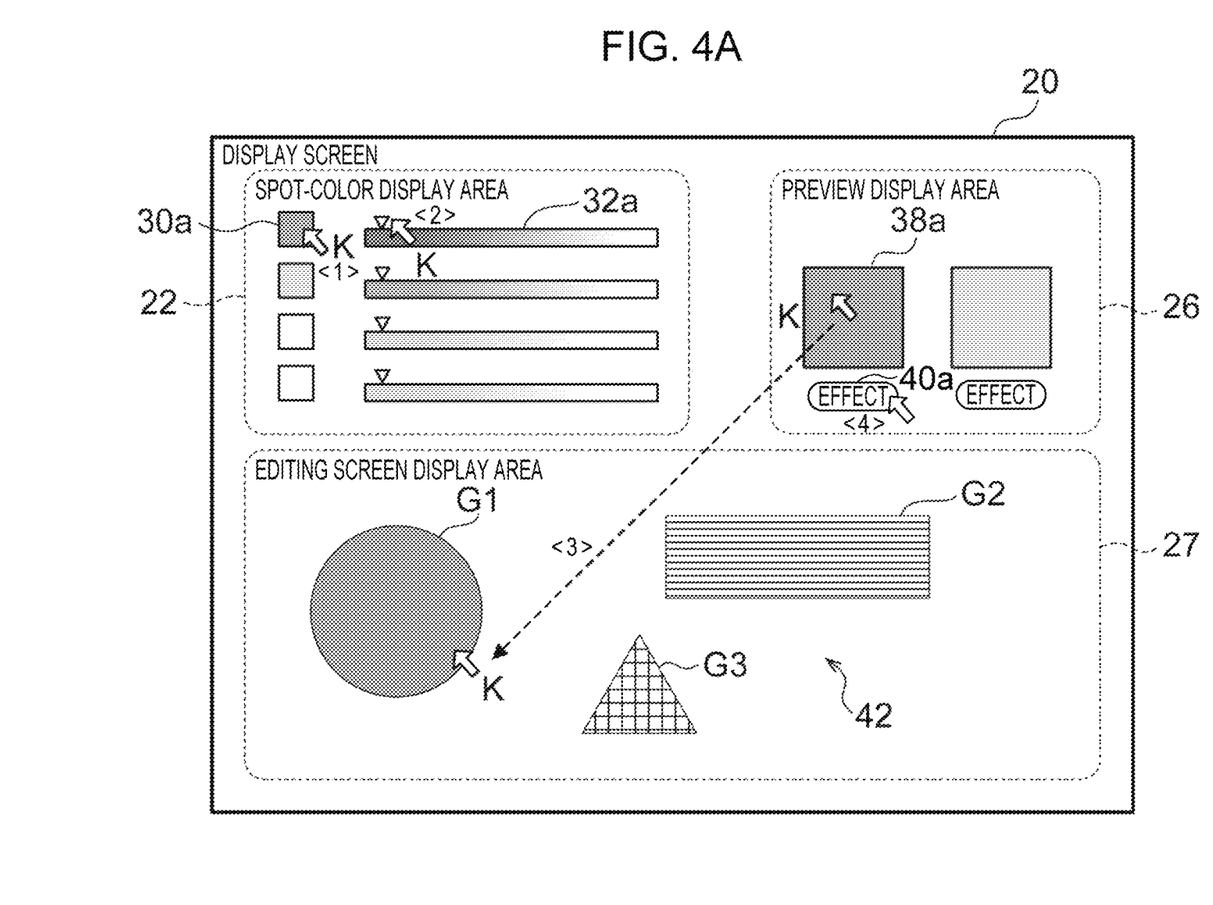
FIGS. 4A and 4B are diagrams describing specification of a texture on an editing screen according to the exemplary embodiment.
Figure 4B:
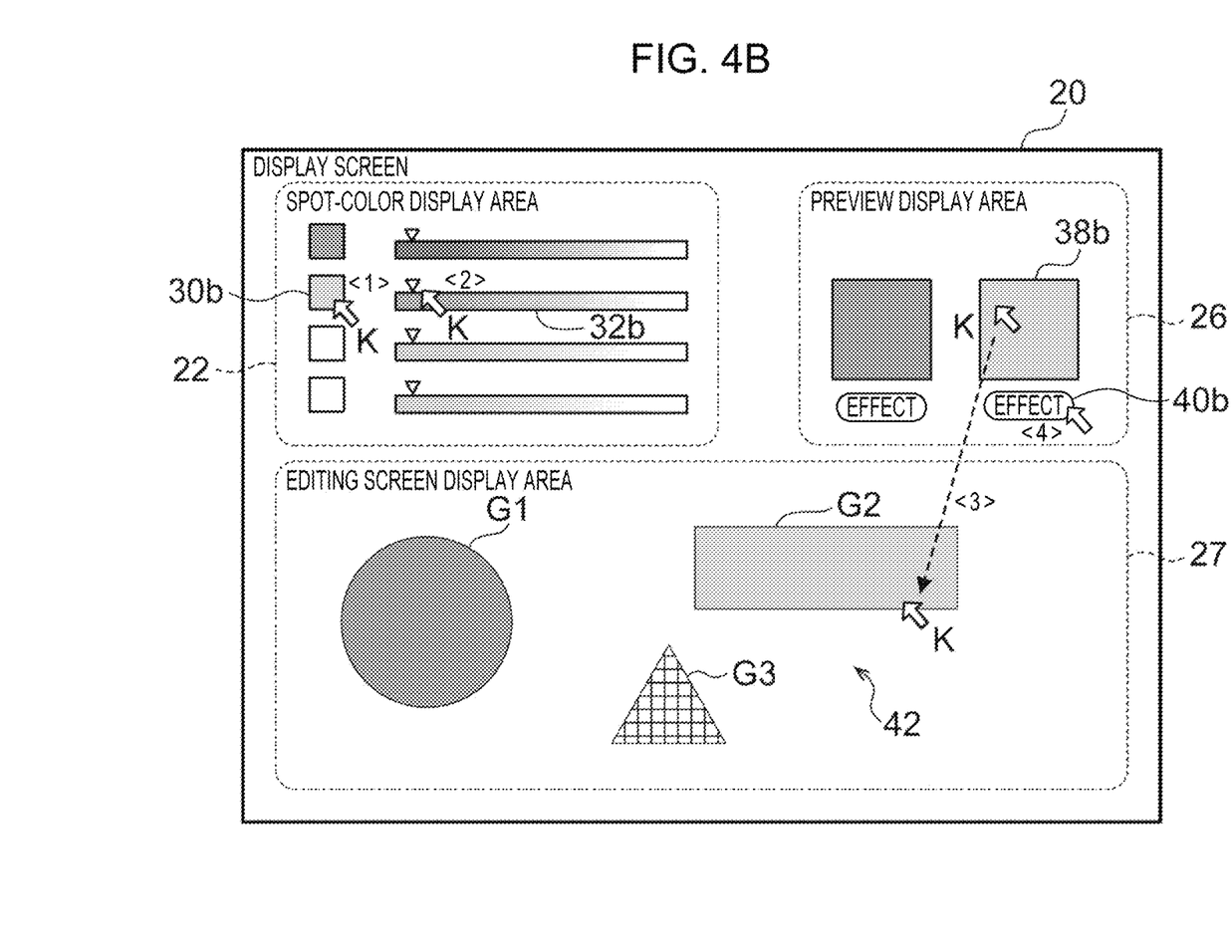
Figure 5A:
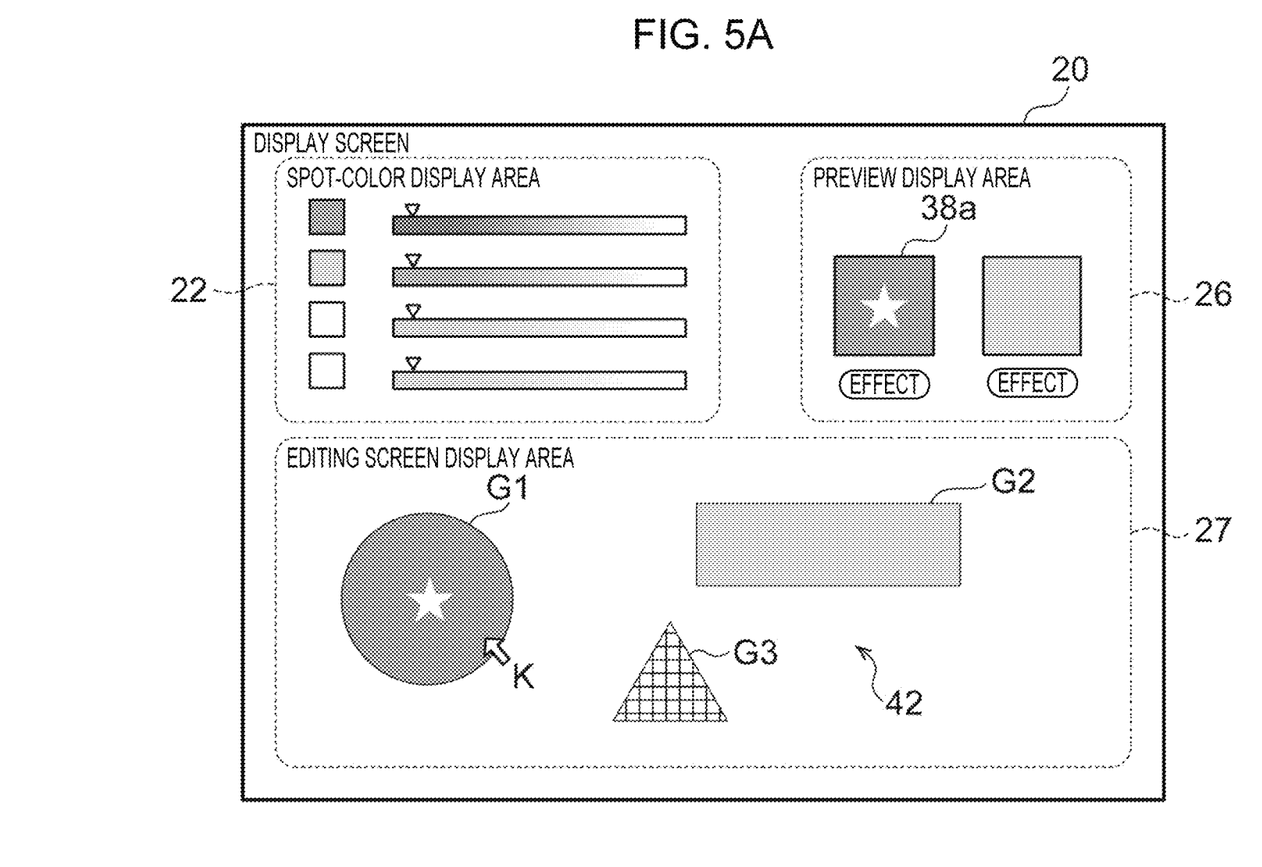
FIGS. 5A and 5B are diagrams describing display of the texture of an image being edited according to the exemplary embodiment.
Figure 5B:
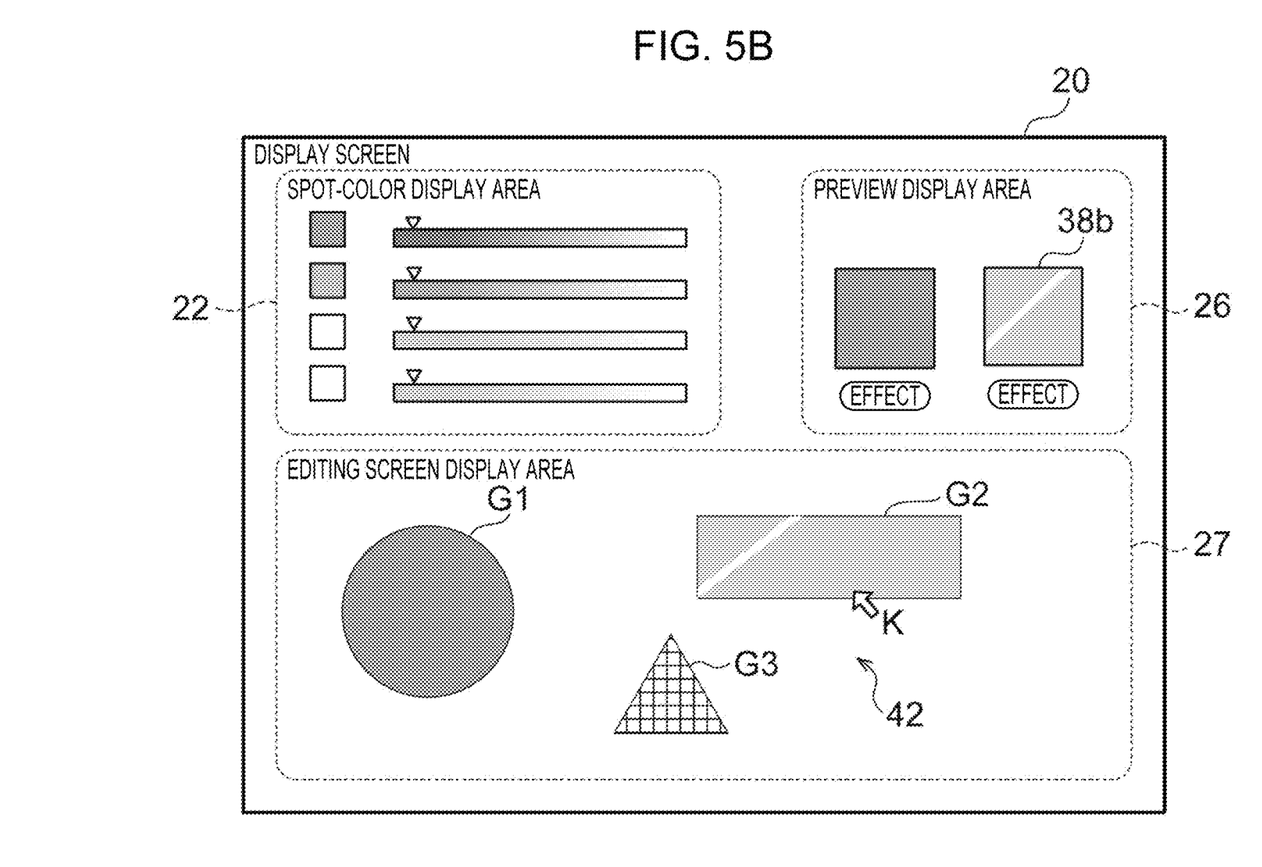

Next, referring to FIGS. 4A to 5B, editing of a target image 42 will be described. FIGS. 4A and 4B illustrate specification of a spot color for the target image 42. FIGS. 5A and 5B illustrate reading of a spot color from the target image 42. The display screen 20 in FIGS. 4A to 5B is different from that in FIG. 2. That is, the display screen 20 illustrated in FIGS. 4A to 5B displays an editing screen display area 27 instead of the RGB display area 24 in FIG. 2. The functions of the spot-color display area 22 and the preview display area 26 illustrated in FIGS. 4A to 5B are the same as those in FIG. 2.

In specification of a spot color for the target image 42, as illustrated in FIG. 4A, at first, the target image 42 is displayed in the editing screen display area 27. The target image 42 in this example includes partial images G1, G2, and G3. Among these partial images G1, G2, and G3, those for specifying a spot color in this example are the partial images G1 and G2.

In contrast, necessary spot colors are displayed in the preview display area 26. The spot colors in this case may be created each time by the procedure illustrated in FIG. 2. Alternatively, the spot colors stored in advance in the memory 18 may be read and displayed in the preview display area 26. In this example, the case of specifying gold displayed in the first preview part 38a for the partial image G1 (FIG. 4A), and the case of specifying silver displayed in the second preview part 38b for the partial image G2 (FIG. 4B) are illustrated by way of example. Although the case of displaying two spot colors, gold and silver, in the preview display area 26 is described by way of example in the exemplary embodiment, the exemplary embodiment is not restricted to this case, and a necessary number of spot colors for the target image 42 may be displayed. Here, the editing screen display area 27 corresponds to a "target display section" according to an exemplary embodiment of the present invention, and the editing screen display area 27 and the preview display area 26 correspond to an "association display section" according to an exemplary embodiment of the present invention.

In the case of specifying gold for the partial image G1, the gold selecting part 30a is selected using the cursor K (an operation indicated as <1> in FIG. 4A), the gradation of gold is set using the gold gradation bar 32a (an operation indicated as <2> in FIG. 4A), and gold is displayed in the first preview part 38a. Next, the first preview part 38a is specified using the cursor K and is drag-and-dropped onto the partial image G1 (an operation indicated as <3> in FIG. 4A). In doing so, gold is specified for the partial image G1, which is a partial area of the target image 42. At this time, the texture of gold in the partial image G1 may be checked by pressing the first effect button 40a (an operation indicated as <4> in FIG. 4A).

In contrast, in the case of specifying silver for the partial image G2, the silver selecting part 30b is selected using the cursor K (an operation indicated as <1> in FIG. 4B), the gradation of silver is set using the silver gradation bar 32b (an operation indicated as <2> in FIG. 4B), and silver is displayed in the second preview part 38b. Next, the second preview part 38b is specified using the cursor K and is drag-and-dropped onto the partial image G2 (an operation indicated as <3> in FIG. 4B). In doing so, silver is specified for the partial image G2, which is a partial area of the target image 42. At this time, the texture of silver in the partial image G2 may be checked by pressing the second effect button 40b (an operation indicated as <4> in FIG. 4B).

With the above operations, spot colors are specified for the partial images G1 and G2 of the target image 42. In other words, for example, the coordinate data of the partial image G1 and gold are associated with each other, and the coordinate data of the partial image G2 and silver are associated with each other. The partial images G1 and G2 associated with gold and silver, respectively, may be stored in memory such as the memory 18. Needless to say, the image area of the partial image G3 for which no such operation as above has been performed remains as the original image data. In addition, a process color may be used for metallic paper (silver paper or gold paper) in the case of selecting paper (background).

Next, referring to FIGS. 5A and 5B, reading of spot colors from the target image 42, for which spot colors have been specified by the operations described using FIGS. 4A and 4B, will be described.

At first, as illustrated in FIG. 5A, the target image 42 is read from memory such as the memory 18 and is displayed in the editing screen display area 27.

Next, to display the spot color of the partial image G1, as illustrated in FIG. 5A, the cursor K is moved to the partial image G1 and the partial image G1 is double-clicked. In doing so, the texture of gold associated with the partial image G1, that is, glossiness or the like, is presented in the editing screen display area 27. At this time, the spot-color display area 22 and the preview display area 26 may be operated using the operation unit 16 to change the characteristics of the spot color or the spot color itself. The changed partial image G1 may be further stored in memory such as the memory 18.

In contrast, to display the spot color of the partial image G2, as illustrated in FIG. 5B, the cursor K is moved to the partial image G2 or the partial image G2 is double-clicked. In doing so, the texture of silver associated with the partial image G2, that is, glossiness or the like, is presented in the editing screen display area 27. At this time, the spot-color display area 22 and the preview display area 26 may be operated using the operation unit 16 to change the characteristics of the spot color or the spot color itself. The changed partial image G2 may be further stored in memory such as the memory 18.

Regarding a transparent color serving as a spot color according to the exemplary embodiment, although the configuration where a transparent color is selected using the transparent-color selecting part 30c and the transmittance is selected using the transmittance setting bar 33 has been described by way of example, the case is not restricted to this configuration. For example, the configuration may be such that a color arranged below a layer of a transparent color selected using the transparent-color selecting part 30c may be specified using, for example, the RGB display area 24, and the texture of the base color, such as the glossiness of red, may be presented in the preview display area 26 and the editing screen display area 27.

Furthermore, watermark information which is one form of presenting transparency may be represented using a transparent color. That is, for example, the visibility of a spot color in the preview display area 26 or the visibility of dots or a checkered pattern on the base of the target image 42 (the partial images G1, G2, and G3) displayed in the editing screen display area 27 may be changed over time to represent that a transparent color is arranged as watermark information on the base.

In addition, although the configuration where the texture of a set and selected spot color is presented in the preview display area 26 has been described by way of example in the above-described exemplary embodiment, the case is not restricted to this configuration, and the texture may be presented using one of the spot-color selecting parts 30 in the spot-color display area 22. In other words, the preview display area 26 may be omitted. Furthermore, for example, each color arranged in the color palette 34 may be provided with an animation function to present a texture in the color palette 34.

In addition, although the configuration where a white image is changed over time inside an image with the base color to present a texture such as glossiness has been described by way of example in the above-described exemplary embodiment, the case is not restricted to this configuration, and saturation for fluorescent representation may be varied or the density of white to be changed over time may be varied, thereby representing differences in texture. Furthermore, although the case in which the direction of change of the size of a white image with a predetermined shape or the direction of movement of a white image with a predetermined shape is one direction has been described by way of example in the above-described exemplary embodiment, the case is not restricted to this case, and the change of the size of a white image or the direction of movement may be made at random.

In addition, the types of spot colors may be different depending on the type of image forming apparatus. In such a case, the display screen 20 whose spot-color display area 22 is particularly made different is created for each type of image forming apparatus and may be stored in memory such as the memory 18.

Each process performed by the information processing apparatus according to the above-described exemplary embodiment may be recorded in memory as a program for causing a computer to execute the process and may be distributed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a display that displays an image; and
    a controller that controls the display to display a color setting section that sets information regarding a selected spot color selected from among a plurality of predetermined spot colors, and an effect presenting section that presents visual effect information representing a visual effect of the selected spot color, wherein the plurality of predetermined spot colors include at least one of gold, silver, a transparent color, a high saturation color, and a pearl color.

2. The information processing apparatus according to claim 1, wherein the controller changes the visual effect information over time inside a predetermined area in the selected spot color, and presents the changed visual effect information.

3. The information processing apparatus according to claim 2, wherein the visual effect information is an image of luminance information of a spot color.

4. The information processing apparatus according to claim 3, wherein the image of luminance information is a white image.

5. The information processing apparatus according to claim 2, wherein the controller moves the visual effect information with a predetermined shape in a predetermined direction over time inside the predetermined area, and presents the moved visual effect information.

6. The information processing apparatus according to claim 5, wherein the predetermined shape is a linear shape extending in a predetermined direction.

7. The information processing apparatus according to claim 2, wherein the controller changes size of the visual effect information with a predetermined shape over time inside the predetermined area, and presents the changed visual effect information.

8. The information processing apparatus according to claim 7, wherein the predetermined shape is any of a circle, an ellipse, and a polygon.

9. The information processing apparatus according to claim 1, wherein the controller further causes the display to display a target display section that displays a processing target image, and an association display section that associates a selected spot color selected in the color setting section with a specified area of the processing target image displayed in the target display section.

10. The information processing apparatus according to claim 9, further comprising:
    memory that stores information, wherein the controller causes the memory to store the specified area and the selected spot color associated with the specified area in association with each other.

11. The information processing apparatus according to claim 9, wherein the controller further causes the effect presenting section to present a visual effect of the selected spot color associated with the specified area of the processing target image displayed in the target display section.

12. The information processing apparatus according to claim 1, wherein the plurality of predetermined spot colors further include white.

13. The information processing apparatus according to claim 1, wherein the information regarding the selected spot color includes a type of the selected spot color and a degree of gradation according to each type of the selected spot color.

14. A non-transitory computer readable medium storing a program causing a computer to execute a process, the process comprising:

causing a computer to function as the controller of the information processing apparatus according to claim 1.

15. The information processing apparatus according to claim 1, wherein the color setting section further sets a density of each of the predetermined spot colors.

16. An information processing apparatus comprising:

display means for displaying an image; and control means for controlling the display means to display a color setting section that sets information regarding a selected spot color selected from among a plurality of predetermined spot colors, and an effect presenting section that presents visual effect information representing a visual effect of the selected spot color, wherein the plurality of predetermined spot colors include at least one of gold, silver, a transparent color, a high saturation color, and a pearl color.

* * * * *